Nov. 3, 1925.
H. C. LAW
1,560,387
MOTOR DRIVE FOR WRINGERS
Filed Nov. 19, 1924
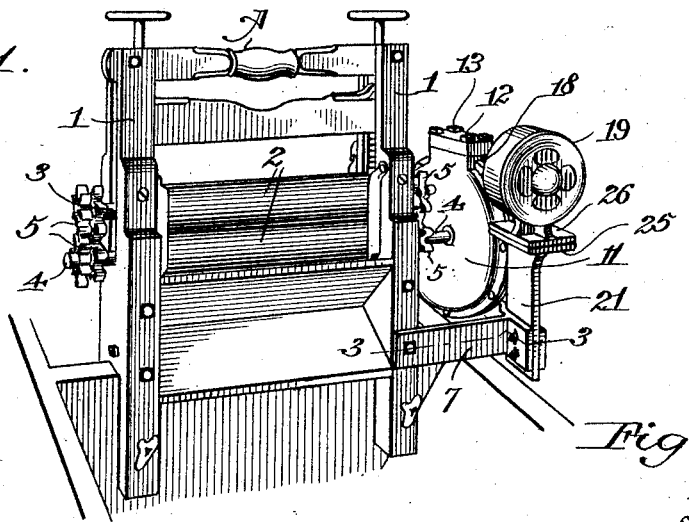
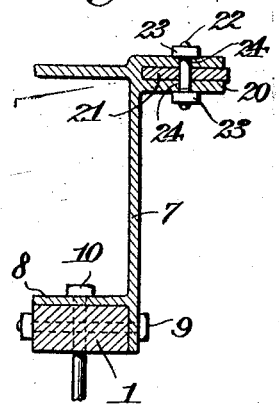
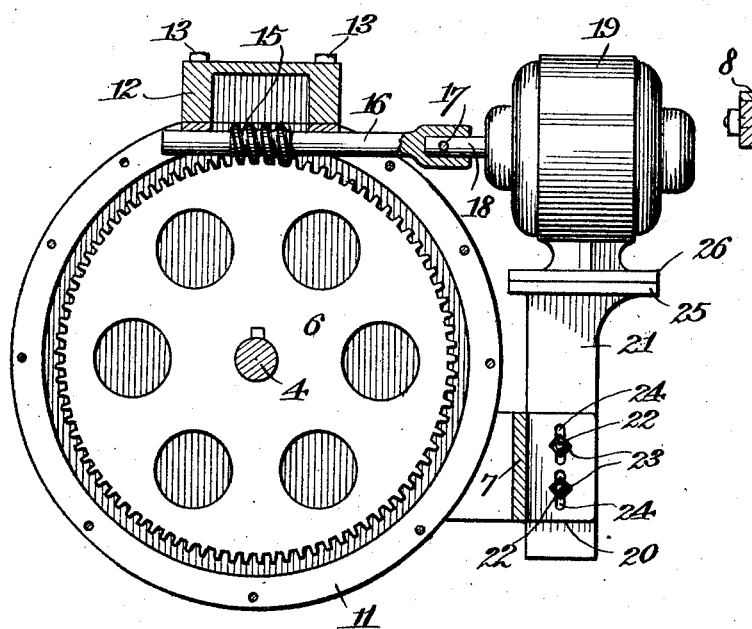
WITNESSES:
INVENTOR,
Harry C. Law.
BY
ATTORNEYS.

Patented Nov. 3, 1925.

1,560,387

UNITED STATES PATENT OFFICE.

HARRY C. LAW, OF HASTINGS-ON-THE-HUDSON, NEW YORK.

MOTOR DRIVE FOR WRINGERS.

Application filed November 19, 1924. Serial No. 750,858.

*To all whom it may concern:*

Be it known that I, HARRY C. LAW, a citizen of the United States, and a resident of Hastings-on-the-Hudson, in the county of Westchester and State of New York, have invented a new and Improved Motor Drive for Wringers, of which the following is a full, clear, and exact description.

This invention relates to motor drives for wringers, an object of the invention being to provide an improved attachment supporting a motor, and an improved power transmitting mechanism connected with the drive shaft of the wringer.

This invention relates particularly to wringers of the portable type, and the invention has to do with an improved construction of attachment which can be readily secured to a standard type of wringer and which will transform the wringer from a hand-operated device to a power driven device.

With these and other objects in view, the invention consists in certain novel features of construction and combinations and arrangements of parts which will be more fully hereinafter described and pointed out in the claim.

In the accompanying drawings—

Figure 1 is a perspective view showing my invention as applied to a wringer of standard type;

Figure 2 is an enlarged view partly in elevation but mainly in section illustrating the gearing, the casing and the motor mounting;

Figure 3 is an enlarged fragmentary view in section on the line 3—3 of Figure 1.

A represents a wringer of standard type having uprights 1—1 providing mounting for a pair of rollers 2, the latter supported upon shafts 3 and 4, respectively, and connected by intermeshing gears 5. The shaft 4 constitutes a drive shaft and is ordinarily provided with a crank arm (not shown) to turn the same.

In attaching my improved motor drive I remove the ordinary crank arm, and key or otherwise secure a relatively large worm wheel 6 to the shaft 4. This worm wheel constitutes a part of my improved attachment, the latter having a supporting bracket 7, and the parts constituting said attachment arranged and assembled in an improved manner as will now be described.

The bracket 7 is angular in form, is horizontally positioned relative to the wringer and is provided at one end with a laterally projecting arm 8 integral with the bracket and spaced from the end of the bracket so that this extremity of the bracket is angular in form, the arm 8 being positioned against the side of one of the uprights 1 and the extremity of the bracket proper being located at the edge of the upright 1, and said parts of the bracket secured to the upright by bolts 9 and 10 so that the bracket is rigidly held against movement in any direction.

The opposite or outer end of the angular bracket 7 is secured to a casing 11 in which the worm gear 6 is mounted. This casing 11 is of the two-part type and is open at its upper portion, which upper portion is normally closed by a removable cap 12 secured by screws or bolts 13 to the main portion of the casing and acting as a removable cover for the worm 15 which meshes with the worm wheel 6. This worm 15 is secured to a worm shaft 16, and the latter removably coupled as shown at 17 to the shaft 18 of an electric motor 19.

The angle bracket 7 above referred to, at its angle, is formed with a bifurcated extension 20 in which a flat vertical post 21 is secured by bolts 22 and nuts 23. These bolts 22 are projected through openings in the post 21 and through vertical elongated slots 24 in the extension 20. These slots permit of a relative amount of vertical adjustment of the post to allow a proper positioning of the parts. A platform 25 is formed on the upper end of the post 21 and on this platform 25 the base 26 of motor 19 is supported and may be secured in any desired manner. The bolts 9 and 10 which are utilized to secure the bracket 7 to the wringer constitute a portion of the normal wringer construction so that it is unnecessary to alter or change the construction of the wringer in the slightest to enable my approved attachment to be connected.

The operation is as follows:

When the motor 19 is energized it transmits motion through the shafts 18 and 16 and worm 15 to drive the worm wheel 6 and shaft 4 through the medium of the gears 5 to transmit motion to the rolls 2. It is obvious that I may employ any desired form of switch to control the motor and it is desirable that the switch and the circuit be such as to give the motor the desired speeds and permit reversal of the motor as occasion may require. As it is my intention to employ standard equipment for this purpose I have intentionally refrained from illustrating the same as my invention is directed more specifically to the attachment itself and not to any control.

Various slight changes and alterations might be made in the general form of the parts described without departing from my invention, and hence I do not limit myself to the precise details set forth but consider myself at liberty to make such slight changes and alterations as fairly fall within the spirit and scope of the appended claim.

I claim:

An attachment of the character described comprising a bracket adapted at one end to be secured to a wringer, a gear rotatably mounted upon said bracket and arranged to be fixed to the drive shaft of said wringer, a bifurcated extension projecting laterally from said bracket, a vertical post partially received within said bifurcated extension, means associated with said extension and with said post for vertical adjustment of said post, a worm meshing with the gear, a shaft fixed to the worm, and an electric motor supported upon said post at the upper end thereof and detachably coupled with said worm shaft.

HARRY C. LAW.